United States Patent
Zang et al.

(10) Patent No.: US 12,096,086 B2
(45) Date of Patent: Sep. 17, 2024

(54) BULLET-SCREEN COMMENT DISPLAY

(71) Applicant: Shanghai Bilibili Technology Co., Ltd., Shanghai (CN)

(72) Inventors: Zhicong Zang, Shanghai (CN); Chaoran Li, Shanghai (CN); Xin Liu, Shanghai (CN); Zhihao Hu, Shanghai (CN); Guojia Chen, Shanghai (CN); Jiarui Zhao, Shanghai (CN); Zhuofan Liu, Shanghai (CN); Jingqiang Zhang, Shanghai (CN); Weini Tian, Shanghai (CN); Zhuangzhuang Shi, Shanghai (CN); Zengxiang Lv, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 18/135,263

(22) Filed: Apr. 17, 2023

(65) Prior Publication Data
US 2024/0137618 A1    Apr. 25, 2024

(30) Foreign Application Priority Data
May 17, 2022    (CN) .......................... 202210535845.5

(51) Int. Cl.
| | | |
|---|---|---|
| H04N 21/2543 | (2011.01) | |
| G06T 5/77 | (2024.01) | |
| H04N 21/422 | (2011.01) | |
| H04N 21/431 | (2011.01) | |
| H04N 21/442 | (2011.01) | |
| H04N 21/475 | (2011.01) | |
| H04N 21/4788 | (2011.01) | |
| H04N 21/488 | (2011.01) | |
| H04N 21/81 | (2011.01) | |

(52) U.S. Cl.
CPC ........... *H04N 21/4788* (2013.01); *G06T 5/77* (2024.01)

(58) Field of Classification Search
None
See application file for complete search history.

(56) References Cited

U.S. PATENT DOCUMENTS

2020/0099988 A1*  3/2020  Liu ................... H04N 21/25883
2020/0364461 A1* 11/2020  Shi ....................... G06V 10/806

FOREIGN PATENT DOCUMENTS

CN            111083568        *  4/2020

\* cited by examiner

*Primary Examiner* — Brian T Pendleton
*Assistant Examiner* — Jean D Saint Cyr
(74) *Attorney, Agent, or Firm* — McAndrews, Held & Malloy, Ltd.

(57) ABSTRACT

This application provides a bullet-screen comment display method, where the bullet-screen comment display method includes: determining bullet-screen comment area basic information corresponding to a target bullet-screen comment from a target picture; identifying an invalid pixel set of the target picture; determining a bullet-screen comment filling area corresponding to the target bullet-screen comment based on the bullet-screen comment area basic information and the invalid pixel set; and filling the bullet-screen comment filling area with the target bullet-screen comment.

18 Claims, 8 Drawing Sheets

BULLET-SCREEN COMMENT DISPLAY

CROSS-REFERENCE TO RELATED APPLICATION

The present application claims priority to Chinese Patent Application No. 202210535845.5, filed with the China National Intellectual Property Administration on May 17, 2022, which is incorporated herein by reference in its entirety.

TECHNICAL FIELD

This application relates to the field of computer technologies, and in particular, to a bullet-screen comment display method. This application also relates to a computing device and a non-transitory computer-readable storage medium.

BACKGROUND

A bullet-screen comment is an information exchange form when a user is currently watching a video. The user can communicate with another user watching a same video by using the bullet-screen comment. Currently, there are some scenarios or scenes in the video that cause resonance of a large quantity of users. The users support and encourage these scenarios and scenes. A current support manner is that the user sends a bullet-screen comment.

SUMMARY

According to a first aspect of the embodiments of this application, a bullet-screen comment display method is provided, including:
  determining bullet-screen comment area basic information corresponding to a target bullet-screen comment from a target picture;
  identifying an invalid pixel set of the target picture;
  determining a bullet-screen comment filling area corresponding to the target bullet-screen comment based on the bullet-screen comment area basic information and the invalid pixel set; and
  filling the bullet-screen comment filling area with the target bullet-screen comment.

According to a second aspect of the embodiments of this application, a computing device is provided, including one or more processors; and a memory, storing one or more programs configured to be executed by the one or more processors, the one or more programs including instructions for:
  determining bullet-screen comment area basic information corresponding to a target bullet-screen comment from a target picture;
  identifying an invalid pixel set of the target picture;
  determining a bullet-screen comment filling area corresponding to the target bullet-screen comment based on the bullet-screen comment area basic information and the invalid pixel set; and
  filling the bullet-screen comment filling area with the target bullet-screen comment.

According to a third aspect of the embodiments of this application, a non-transitory computer-readable storage medium is provided, where the non-transitory computer-readable storage medium stores one or more programs comprising instructions that, when executed by one or more processors of a computing device, cause the computing device to perform operations including:
  determining bullet-screen comment area basic information corresponding to a target bullet-screen comment from a target picture;
  identifying an invalid pixel set of the target picture;
  determining a bullet-screen comment filling area corresponding to the target bullet-screen comment based on the bullet-screen comment area basic information and the invalid pixel set; and
  filling the bullet-screen comment filling area with the target bullet-screen comment.

DETAILED DESCRIPTION OF EMBODIMENTS

Figure 1:
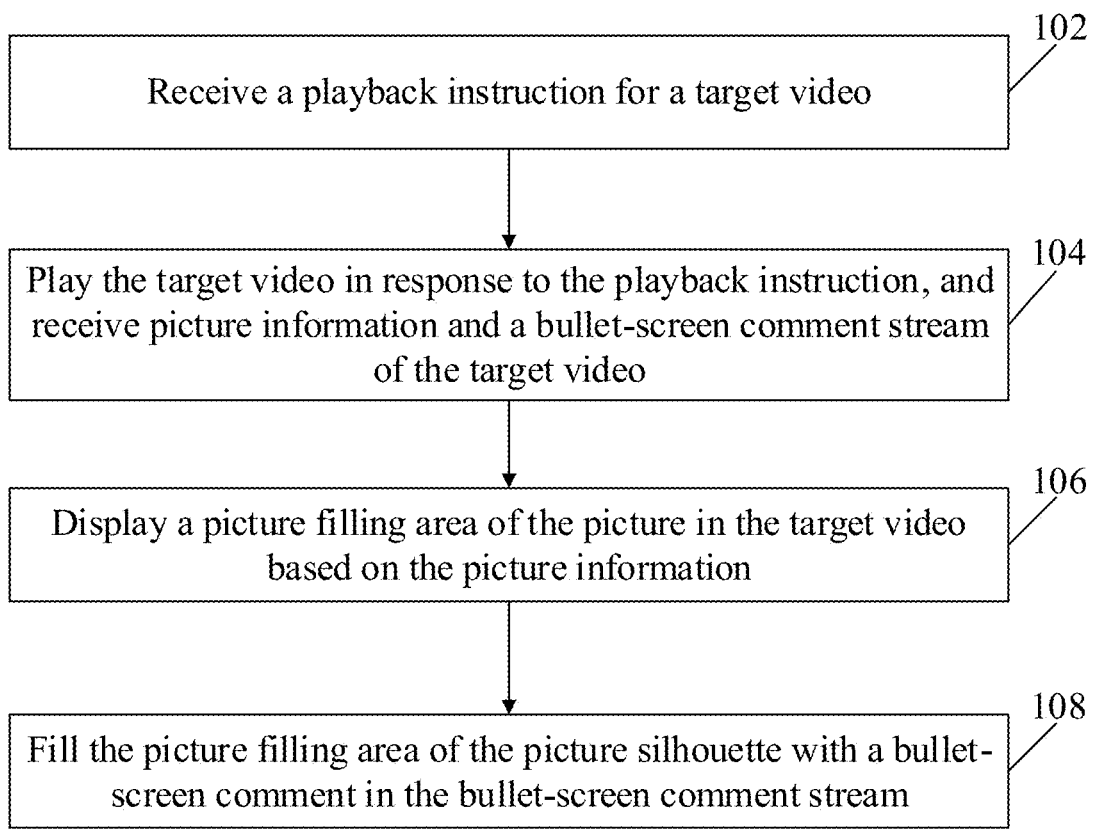
FIG. 1 is a flowchart of a first bullet-screen comment display method according to some embodiments of this application.

Many specific details are described in the following descriptions to facilitate full understanding of this application. However, this application can be implemented in many other manners different from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a" and "the" of singular forms used in one or more embodiments and the appended claims of this application are also intended to include plural forms, unless otherwise specified in the context clearly. It should also be understood that, the term "and/or" used in one or more embodiments of this application indicates and includes any or all possible combinations of one or more associated listed items.

It should be understood that, although terms such as "first" and "second" may be used in one or more embodiments of this application to describe various types of information, the information is not limited to these terms. These terms are only used to differentiate between information of the same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

The inventor of the present application finds that a current display manner of the bullet-screen comment is single. This cannot fully reflect a current resonance scenario and scene, and cannot fit video content to express emotion and resonance of the user.

Therefore, a bullet-screen comment display manner is urgently needed, so that the user can support and encourage the current scenario and scene.

The bullet-screen comment display method provided in this application includes: determining bullet-screen comment area basic information corresponding to a target bullet-screen comment from a target picture; identifying an invalid pixel set of the target picture; determining a bullet-screen comment filling area corresponding to the target bullet-screen comment based on the bullet-screen comment area basic information and the invalid pixel set; and filling the bullet-screen comment filling area with the target bullet-screen comment.

In some embodiments of this application, in a process of filling the target picture with the bullet-screen comment, the bullet-screen comment filling area corresponding to the target bullet-screen comment can be quickly identified in the target picture, thereby improving identification efficiency.

First, nouns related to one or more embodiments of this application are explained.

Bullet-screen comment: a critical text that pops up when watching a video.

With development of computer technologies, sending a bullet-screen comment in a video has become a common behavior when people watch a video in daily life. Currently, there are some scenarios and scenes in the video that cause resonance of a large quantity of users. The users support and encourage these scenarios and scenes. This is used to express support. A current support manner is mainly that the user sends a bullet-screen comment. However, a current display manner of the bullet-screen comment is single. This cannot fully reflect a current resonance scenario and scene, and cannot fit video content to express emotions such as support and encouragement from the user.

Based on this, this application provides a bullet-screen comment display method. This application also relates to a bullet-screen comment display apparatus, a computing device, and a computer-readable storage medium. Details are described one by one in the following embodiments.

FIG. 1 is a flowchart of a first bullet-screen comment display method according to some embodiments of this application. The method specifically includes the following steps.

Step 102: Receive a playback instruction for a target video.

The target video is specifically a video that is used to play in this embodiment of this application. When a user wants to watch a video by using a client, the user usually selects a video that the user wants to watch, and clicks a play button. The client may receive the playback instruction sent by the user for the target video. In actual application, the client used by the user may be a terminal, for example, a portable computer, a tablet computer, a smartphone, or a television. In this application, the client is not limited, provided that the target video can be played.

In a specific implementation provided in this application, an example in which the target video is a video of a specific concert is used. The user watches a video of a specific concert by using a tablet computer, and the tablet computer receives a playback instruction for the video of the concert.

Step 104: Play the target video in response to the playback instruction, and receive picture information and a bullet-screen comment stream of the target video.

The picture information includes a picture.

After the playback instruction for the target video is received, the corresponding target video may be played in response to the playback instruction. In actual application, the target video may be stored in a server, and the target video stream is pulled from the server based on a corresponding watching address. The target video may alternatively be a video that is downloaded to the client in advance.

When the target video is being played, the picture information and the bullet-screen comment stream that are sent from the server for the target video may be received, where the picture information specifically means related information corresponding to the picture, such as a picture, a location of the picture displayed in the video, a size of the picture, a start time point displayed in the picture, and an end time point displayed in the picture. The picture information is pre-configured by a technician and is uploaded to the server for association with the target video.

The picture specifically means a cheering picture that is prepared in advance for the target video. The picture is a picture that is configured by a technician and that corresponds to the target video, for example, the target video is a concert of a celebrity, and the picture may be a cheering slogan of the celebrity. For another example, the target video is a promotional video of a place, and a picture may be "cheer up xx place". In actual application, the picture is pre-made by a technician and uploaded to the server, and is bound with the target video. Still further, the picture may be an endorsement picture, and endorsement is to cheer for a favorite idol. In this application, it means a scenario in which a bullet-screen comment appears, that is, to cheer for video content, and express love and support.

The bullet-screen comment is specifically a bullet-screen comment that is sent by a user for a picture, where the bullet-screen comment is different from a common bullet-screen comment, and the bullet-screen comment is a cheering bullet-screen comment that is sent by an audience for the target video. In actual application, a bullet-screen comment may be fixed bullet-screen comment content, for example, a cheering slogan for a celebrity, or "cheer up xx place". The bullet-screen comment may alternatively be customized content, and is sent by using a special sending instruction. For example, the user may input a customized bullet-screen comment, and then click a "bullet-screen comment" button to send the bullet-screen comment. In actual application, a specific sending form of the bullet-screen comment is not limited. In some embodiments, in order to express a sense of participation of support and encouragement, the bullet-screen comment adopts fixed bullet-screen comment content, and the bullet-screen comment is neat and unified, so that support and encouragement are more thrilling.

In a specific implementation provided in this application, the foregoing example is still used, the video of the concert is played, and picture information and a bullet-screen comment stream of the video of the concert are received. The picture information includes a picture (the picture includes a cheering slogan), a start time point displayed in the picture, an end time point displayed in the picture, a size of the picture, location information displayed in the picture, and the like.

Step 106: Display a picture filling area of the picture in the target video based on the picture information.

Figure 2:
FIG. 2 is a schematic diagram of a picture according to some embodiments of this application.

The picture filling area specifically means picture silhouette information. FIG. 2 is a schematic diagram of the picture according to this application. The picture filling area is silhouette information corresponding to a text part in the picture. In a process of playing the target video, the picture filling area corresponding to the picture may be played in the target video according to the picture information.

Figure 3:
FIG. 3 is a schematic diagram of displaying a picture filling area in a target video according to some embodiments of this application.

In actual application, information such as a word and an image may be displayed in the picture. When the text is displayed in the picture, the picture filling area is a silhouette of a text part, and a part other than the text part is transparent. This does not affect normal watching of the target video. FIG. 3 is a schematic diagram of displaying a picture filling area in a target video according to some embodiments of this application. "众志成城" (Chinese characters, which mean "unity is strength") is corresponding texts in the picture. As shown in FIG. 3, the picture filling area of "众志成城" is displayed in the target video, a silhouette of the four words "众志成城" is displayed, and pixels in the picture except the words "众志成城" are set to be transparent. In this way, an effect of displaying the picture filling area is implemented without affecting the watching of the video.

Specifically, displaying the picture filling area of the picture in the target video based on the picture information includes:
  obtaining the picture filling area of the picture; and
  displaying the picture filling area in the target video based on the picture information.

The picture is a pre-created picture, and the picture filling area is contour information in the picture. After the picture is obtained, the picture filling area of the picture can be obtained based on the picture.

After the picture filling area is obtained, the picture filling area may be displayed in the target video based on the picture information.

Still further, the picture information further includes picture location information.

Displaying the picture filling area of the picture in the target video based on the picture information includes:
  displaying the picture filling area in the target video based on the picture location information.

The picture information further specifically includes picture location information. The picture location information may be a pixel coordinate in the target video. For example, the picture location information is a coordinate (x, y) in the target video, and an upper left corner of the picture filling area may be placed in the coordinate, so that a picture filling area location of the picture is located in the target video.

In actual application, playback duration of the target video is long, and some scenarios and scenes therein may cause resonance of everyone. If the picture filling area is always displayed, normal watching experience of the user is affected. Based on this, in another specific implementation provided in this application, the picture information further includes a picture display time point.

Displaying the picture filling area of the picture in the target video based on the picture information includes:
  monitoring playback time of the target video; and
  displaying the picture filling area in the target video when the playback time reaches the picture display time point.

The picture display time point specifically means a time point displayed in the picture filling area. The playback time specifically means current playback duration of the target video. It should be noted that, the playback time of the target video in this application means relative playback duration of the target video. The user may control the playback time of the target video in a jump or fast forward manner. For example, the playback duration of the target video is 10 minutes. When the user starts to play the target video at the tenth second in the fast forward manner, content of the sixth minute in the target video is played. In this case, the playback time of the target video is 6 minutes, not 10 seconds.

In a specific implementation provided in this application, an example in which total duration of the target video is 5 minutes is used. A picture display time point is 2 minutes and 15 seconds, and playback time of the target video is monitored. When the playback time reaches 2 minutes and 15 seconds, the picture filling area may be displayed in the target video.

Correspondingly, the picture information further includes a picture end time point.

The method further includes:
  when the playback time reaches the picture end time point, stopping displaying the picture in the target video.

Corresponding to the picture display time point, the picture information further includes a picture end time point, that is, a time point at which the picture stops being displayed in the target video. When the playback time reaches the picture end time point, the picture may be stopped from being displayed in the target video. So far, the current cheering support moment is over.

In a specific implementation provided in this application, the foregoing example is still used, the picture display time point is 10 minutes and 10 seconds, the picture end time point is 11 minutes and 30 seconds, and the picture location information is (x, y). When the concert video is played to the tenth minutes and tenth seconds, the picture filling area of the picture is displayed at a coordinate (x, y), and when the concert video is played to the 11 minutes and 30 seconds, display of the picture is stopped.

Step 108: Fill the picture filling area with a bullet-screen comment in the bullet-screen comment stream.

After the picture filling area is displayed, a bullet-screen comment needs to be filled in the picture filling area, so that a visual effect of filling the picture filling area with the bullet-screen comment is implemented. As shown in FIG. 2, four words "齐心协力" (Chinese characters, which mean "make concerted effort") are filled with the bullet-screen comment in the bullet-screen comment stream. As shown in FIG. 3, four words "众志成城" are filled with the bullet-screen comment in the bullet-screen comment stream.

In actual application, layout information of the bullet-screen comment may be planned based on a shape of content in the picture. For example, a vertical part of the word "志" may be arranged in a vertical direction, a horizontal part of the word "志" may be arranged in a horizontal direction.

In actual application, to improve watching experience of a user, bullet-screen comments filled in the picture filling area should not overlap each other. In this way, the user does not have messy visual experience when watching. Specifically, filling the picture filling area with the bullet-screen comment in the bullet-screen comment stream includes:
  determining a target bullet-screen comment in the bullet-screen comment stream;

determining bullet-screen comment area basic information of the target bullet-screen comment;
determining a bullet-screen comment filling area corresponding to the target bullet-screen comment based on the bullet-screen comment area basic information from the picture filling area; and
filling the bullet-screen comment filling area with the target bullet-screen comment.

Based on this, when the bullet-screen comment is filled, each bullet-screen comment may be sequentially arranged, that is, in some embodiments, one bullet-screen comment is filled each time. In this case, a bullet-screen comment currently to be filled needs to be searched in the bullet-screen comment stream as the target bullet-screen comment. Specifically, the target bullet-screen comment in the bullet-screen comment stream may be determined based on a sending time of the bullet-screen comment, or may be determined based on a bullet-screen comment score of the target bullet-screen comment. In this application, a manner of determining the target bullet-screen comment is not limited, and is subject to actual application.

After the target bullet-screen comment is determined, the bullet-screen comment area basic information of the target bullet-screen comment may be further determined. The bullet-screen comment area basic information specifically means area information of a pixel occupied by the target bullet-screen comment. For example, the target bullet-screen comment is "cheer up, **". To facilitate filling the picture filling area with the target bullet-screen comment, the target bullet-screen comment may be used as a rectangular area, to determine the bullet-screen comment area basic information of the rectangular area. For example, the bullet-screen comment area basic information of the target bullet-screen comment is 15*60, that is, an area occupied by a size of 15*60 pixels.

After the bullet-screen comment area basic information is determined, the bullet-screen comment filling area corresponding to the target bullet-screen comment may be determined in the picture based on the bullet-screen comment area basic information. Specifically, the bullet-screen comment filling area specifically means an area that may be placed in the picture filling area for the target bullet-screen comment. In actual application, traversal mapping may be performed on the bullet-screen comment area basic information in the picture, and a rule of traversal mapping is "do not overlap an existing bullet-screen comment, and the target bullet-screen comment is in the picture filling area". Based on the rule of traversal mapping, the bullet-screen comment filling area corresponding to the target bullet-screen comment may be determined in the picture filling area, that is, the bullet-screen comment filling area may be filled with the target bullet-screen comment.

In actual application, to add the bullet-screen comment in the bullet-screen comment stream to the picture filling area, in this case, a filling location corresponding to the bullet-screen comment needs to be determined in the picture filling area. In actual application, a quantity of bullet-screen comments in the picture filling area gradually increases. To ensure that the picture filling area can be displayed normally, in another specific implementation provided in this application, filling the picture filling area with the bullet-screen comment in the bullet-screen comment stream includes:
determining the target bullet-screen comment in the bullet-screen comment stream, and obtaining a quantity of filling bullet-screen comments and a threshold of the quantity of filling bullet-screen comments in the picture filling area;
when the quantity of filling bullet-screen comments is less than the threshold of the quantity of filling bullet-screen comments, filling the picture filling area with the target bullet-screen comment; and
when the quantity of filling bullet-screen comments is equal to the threshold of the quantity of filling bullet-screen comments, determining a to-be-replaced filling bullet-screen comment in the picture filling area, and updating the to-be-replaced filling bullet-screen comment with the target bullet-screen comment.

Specifically, when the target bullet-screen comment is determined in the bullet-screen comment stream, a quantity of filling bullet-screen comments in the picture filling area needs to be counted. The quantity of filling bullet-screen comments specifically means a quantity of bullet-screen comments that have been filled in the picture filling area. For example, 40 pieces of bullet-screen comments that have been filled in the picture filling area, and the quantity of filling bullet-screen comments is 40. If there are 60 bullet-screen comments filled in the picture filling area, the quantity of filling bullet-screen comments is 60.

The threshold of the quantity of filling bullet-screen comments specifically means a maximum quantity of bullet-screen comments that can be carried in the picture filling area. For example, the threshold of the quantity of filling bullet-screen comments in the picture filling area is 80, it indicates that the picture filling area can be filled with a maximum of 80 bullet-screen comments. If the quantity of bullet-screen comments exceeds 80, the bullet-screen comments overlap, affecting watching experience of an audience.

When the quantity of filling bullet-screen comments is less than the threshold of the quantity of filling bullet-screen comments, it indicates that there is still a bullet-screen comment filling area corresponding to the target bullet-screen comment in the picture filling area, and the picture filling area may be directly filled with the target bullet-screen comment.

When the quantity of filling bullet-screen comments is equal to the threshold of the quantity of filling bullet-screen comments, it indicates that in this case, the picture filling area is filled with the bullet-screen comment. If the target bullet-screen comment is to be filled in the picture filling area, the to-be-replaced filling bullet-screen comment needs to be determined from the picture filling area, where the to-be-replaced filling bullet-screen comment specifically means a bullet-screen comment that is filled in the picture filling area and that may be replaced. After the to-be-replaced filling bullet-screen comment is determined, the to-be-replaced filling bullet-screen comment may be updated with the target bullet-screen comment, so that the picture filling area may be cyclically filled with the bullet-screen comment in the bullet-screen comment stream.

Specifically, determining the to-be-replaced filling bullet-screen comment in the picture filling area includes:
determining, in the picture filling area, that a filling bullet-screen comment with a lowest score is a to-be-replaced filling bullet-screen comment; or
determining, in the picture filling area, that a filling bullet-screen comment with earliest release time is a to-be-replaced filling bullet-screen comment.

In actual application, the determining rule for determining the to-be-filled bullet-screen comment in the picture filling area may be determined based on a sending time of the bullet-screen comment, that is, a filling bullet-screen comment in the picture filling area whose release time is the earliest is selected as the to-be-filled bullet-screen comment.

Alternatively, sorting may be performed based on scores of bullet-screen comments in the picture filling area, and a filling bullet-screen comment with a lowest score is selected as a to-be-replaced filling bullet-screen comment.

In another specific implementation provided in this application, the method further includes:

counting a quantity of filling bullet-screen comments in the picture filling area;

when the quantity of bullet-screen comments reaches a preset quantity of bullet-screen comments, displaying the picture, and counting display duration of the picture; and when the display duration reaches preset display duration, continuing to display the picture filling area, and filling the picture filling area with the bullet-screen comment in the bullet-screen comment stream.

In actual application, the picture filling area of the picture is displayed in the target video based on the picture information. To improve a participation sense of the user, in a process of filling the picture filling area with the bullet-screen comment, the quantity of bullet-screen comments of the filling bullet-screen comment in the picture filling area is further counted. When the quantity of bullet-screen comment reaches the preset quantity of the bullet-screen comment, the picture in the picture information may be directly displayed, and the display duration of the picture is counted. If the display duration reaches the preset display duration, the picture filling area may be continued to be displayed, and the picture filling area continues to be filled with the bullet-screen comment in the bullet-screen comment stream.

In still another specific implementation provided in this application, the method further includes:

receiving a bullet-screen comment sending instruction, where the bullet-screen comment sending instruction carries a spontaneous bullet-screen comment;

determining a spontaneous bullet-screen comment area in the picture filling area; and displaying the spontaneous bullet-screen comment in the spontaneous bullet-screen comment area.

In this implementation, the user may not only watch the target video, picture and bullet-screen comment in the target video, but may also participate in a process of sending the bullet-screen comment, that is, the user may send a bullet-screen comment sending instruction to the client, where the bullet-screen comment sending instruction carries a spontaneous bullet-screen comment. The spontaneous bullet-screen comment specifically means a bullet-screen comment sent by the user. In different application scenarios, content of the spontaneous bullet-screen comment may be the same, or may be different. After receiving the spontaneous bullet-screen comment, the client may determine a spontaneous bullet-screen comment area corresponding to the spontaneous bullet-screen comment from the picture filling area. The spontaneous bullet-screen comment area specifically means an area that is filled with the bullet-screen comment and that is sent by the user. After the spontaneous bullet-screen comment is determined, the spontaneous bullet-screen comment may be displayed in the spontaneous bullet-screen comment area.

The bullet-screen comment display method provided in this embodiment of this application includes: receiving a playback instruction for a target video; playing the target video in response to the playback instruction, and receiving picture information and a bullet-screen comment stream of the target video, where the picture information includes a picture; and displaying a picture filling area of the picture in the target video based on the picture information; and filling the picture filling area with a bullet-screen comment in the bullet-screen comment stream. According to the method provided in this application, a new bullet-screen comment display form is provided. With reference to a scenario and a scene in a video, a picture (a picture filling area) may be filled with the bullet-screen comment with reference to video content to express an emotion of the user, thereby improving user experience and participation of sending the bullet-screen comment, and improving the user's initiative of sending the bullet-screen comment.

Figure 4:
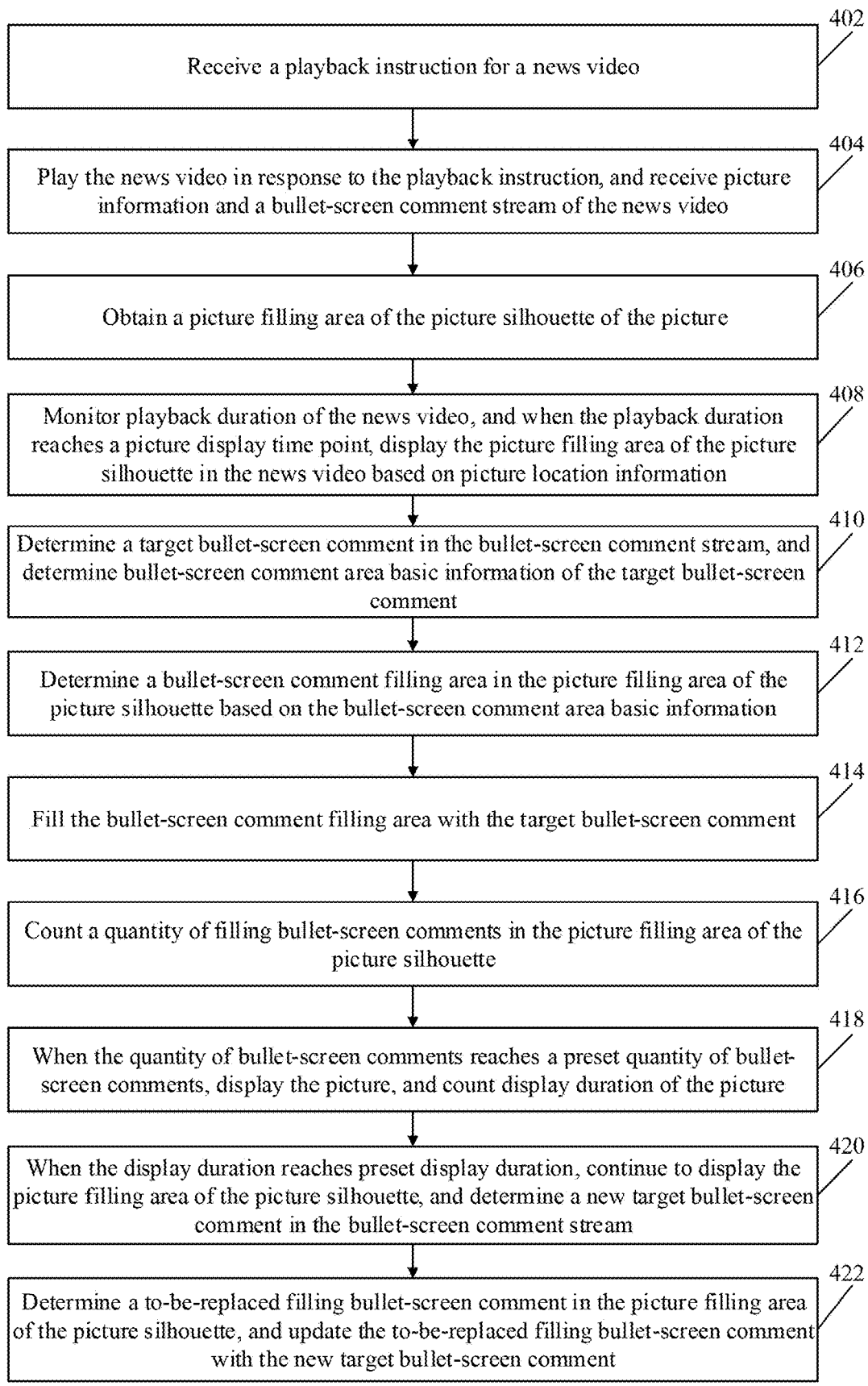
FIG. 4 is a processing flowchart of a first bullet-screen comment display method applied to a news video according to some embodiments of this application.

With reference to FIG. 4, the following further describes the first bullet-screen comment display method by using an example of application of the bullet-screen comment display method provided in this application in a news video. FIG. 4 is a processing flowchart of a bullet-screen comment display method applied to a news video according to some embodiments of this application. The method specifically includes the following steps.

Step 402: Receive a playback instruction for a news video.

Step 404: Play the news video in response to the playback instruction, and receive picture information and a bullet-screen comment stream of the news video.

The picture information includes a picture, picture location information, a picture display time point, and a picture end time point.

Step 406: Obtain a picture filling area of the picture.

Step 408: Monitor playback duration of the news video, and when the playback duration reaches a picture display time point, display the picture filling area in the news video based on the picture location information.

Step 410: Determine a target bullet-screen comment in the bullet-screen comment stream, and determine bullet-screen comment area basic information of the target bullet-screen comment.

Step 412: Determine a bullet-screen comment filling area in the picture filling area based on the bullet-screen comment area basic information.

Step 414: Fill the bullet-screen comment filling area with the target bullet-screen comment.

Step 416: Count a quantity of filling bullet-screen comments in the picture filling area.

Step 418: When the quantity of bullet-screen comments reaches a preset quantity of bullet-screen comments, display the picture, and count display duration of the picture.

Step 420: When the display duration reaches preset display duration, continue to display the picture filling area, and determine a new target bullet-screen comment in the bullet-screen comment stream.

Step 422: Determine a to-be-replaced filling bullet-screen comment in the picture filling area, and update the to-be-replaced filling bullet-screen comment with the new target bullet-screen comment.

According to the method provided in this application, a new bullet-screen comment display form is provided. With reference to a scenario and a scene in a video, a picture (a picture filling area) may be filled with the bullet-screen comment with reference to video content to express an emotion of the user, thereby improving user experience and participation of sending the bullet-screen comment, and improving the user's initiative of sending the bullet-screen comment.

Figure 5:
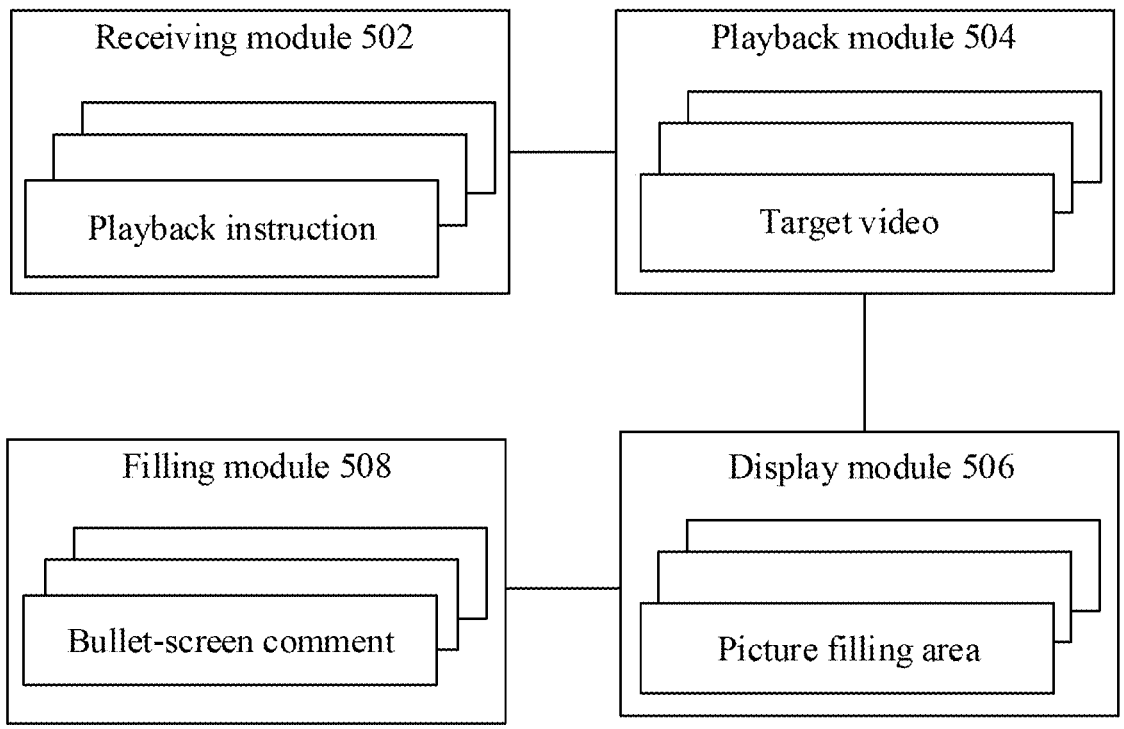
FIG. 5 is a schematic diagram of a structure of a first bullet-screen comment display apparatus according to some embodiments of this application.

Corresponding to the first bullet-screen comment display method embodiment, this application further provides a first bullet-screen comment display apparatus embodiment. FIG. 5 is a schematic diagram of a structure of a bullet-screen comment display apparatus according to some embodiments of this application. As shown in FIG. 5, the apparatus includes:

- a receiving module 502, configured to receive a playback instruction for a target video;
- a playing module 504, configured to play the target video in response to the playback instruction, and receive picture information and a bullet-screen comment stream of the target video, where the picture information includes a picture;
- a display module 506, configured to display a picture filling area of the picture in the target video based on the picture information; and
- a filling module 508, configured to fill the picture filling area with a bullet-screen comment in the bullet-screen comment stream.

In some embodiments, the picture information further includes picture location information.

The display module 506 is further configured to:
display the picture filling area in the target video based on the picture location information.

In some embodiments, the display module 506 is further configured to:
obtain the picture filling area of the picture; and
display the picture filling area in the target video based on the picture information.

In some embodiments, the filling module 508 is further configured to:
- determine a target bullet-screen comment in the bullet-screen comment stream;
- determine bullet-screen comment area basic information of the target bullet-screen comment;
- determine a bullet-screen comment filling area corresponding to the target bullet-screen comment based on the bullet-screen comment area basic information from the picture filling area; and
- fill the bullet-screen comment filling area with the target bullet-screen comment.

In some embodiments, the filling module 508 is further configured to:
- determine a target bullet-screen comment in the bullet-screen comment stream, and obtain a quantity of filling bullet-screen comments and a threshold of the quantity of filling bullet-screen comments in the picture filling area;
- when the quantity of filling bullet-screen comments is less than the threshold of the quantity of filling bullet-screen comments, fill the picture filling area with the target bullet-screen comment; and
- when the quantity of filling bullet-screen comments is equal to the threshold of the quantity of filling bullet-screen comments, determine a to-be-replaced filling bullet-screen comment in the picture filling area, and update the to-be-replaced filling bullet-screen comment with the target bullet-screen comment.

In some embodiments, the filling module 508 is further configured to:
- determine, in the picture filling area, that a filling bullet-screen comment with a lowest score is a to-be-replaced filling bullet-screen comment; or
- determine, in the picture filling area, that a filling bullet-screen comment with earliest release time is a to-be-replaced filling bullet-screen comment.

In some embodiments, the apparatus further includes:
- a counting module, configured to count a quantity of filling bullet-screen comments in the picture filling area;
- a picture display module, configured to: when the quantity of bullet-screen comments reaches a preset quantity of bullet-screen comments, display the picture, and count display duration of the picture; and
- a filling area display module, configured to: when the display duration reaches preset display duration, continue to display the picture filling area, and fill the picture filling area with the bullet-screen comment in the bullet-screen comment stream.

In some embodiments, the apparatus further includes:
- an instruction receiving module, configured to receive a bullet-screen comment sending instruction, where the bullet-screen comment sending instruction carries a spontaneous bullet-screen comment;
- an area determining module, configured to determine a spontaneous bullet-screen comment area in the picture filling area; and
- a bullet-screen comment display module, configured to display the spontaneous bullet-screen comment in the spontaneous bullet-screen comment area.

In some embodiments, the picture information further includes a picture display time point.

The display module 506 is further configured to:
monitor playback time of the target video; and
display the picture filling area in the target video when the playback time reaches the picture display time point.

In some embodiments, the picture information further includes a picture end time point.

The display module 506 is further configured to:
when the playback time reaches the picture end time point, stop displaying the picture in the target video.

The bullet-screen comment display apparatus provided in this embodiment of this application includes: receiving a playback instruction for a target video; playing the target video in response to the playback instruction, and receiving picture information and a bullet-screen comment stream of the target video, where the picture information includes a picture; displaying a picture filling area of the picture in the target video based on the picture information; and filling the picture filling area with a bullet-screen comment in the bullet-screen comment stream. According to the apparatus provided in this application, a new bullet-screen comment display form is provided. With reference to a scenario and a scene in a video, a picture (a picture filling area) may be filled with the bullet-screen comment with reference to video content to express an emotion of the user, thereby improving user experience and participation of sending the bullet-screen comment, and improving the user's initiative of sending the bullet-screen comment.

The foregoing is a schematic solution of the first bullet-screen comment display apparatus in this embodiment. It should be noted that the technical solution of the bullet-screen comment display apparatus and the technical solution of the foregoing bullet-screen comment display method belong to the same concept. For details not described in the technical solution of the bullet-screen comment display apparatus, references can be made to the descriptions of the technical solution of the foregoing bullet-screen comment display method.

Figure 6:
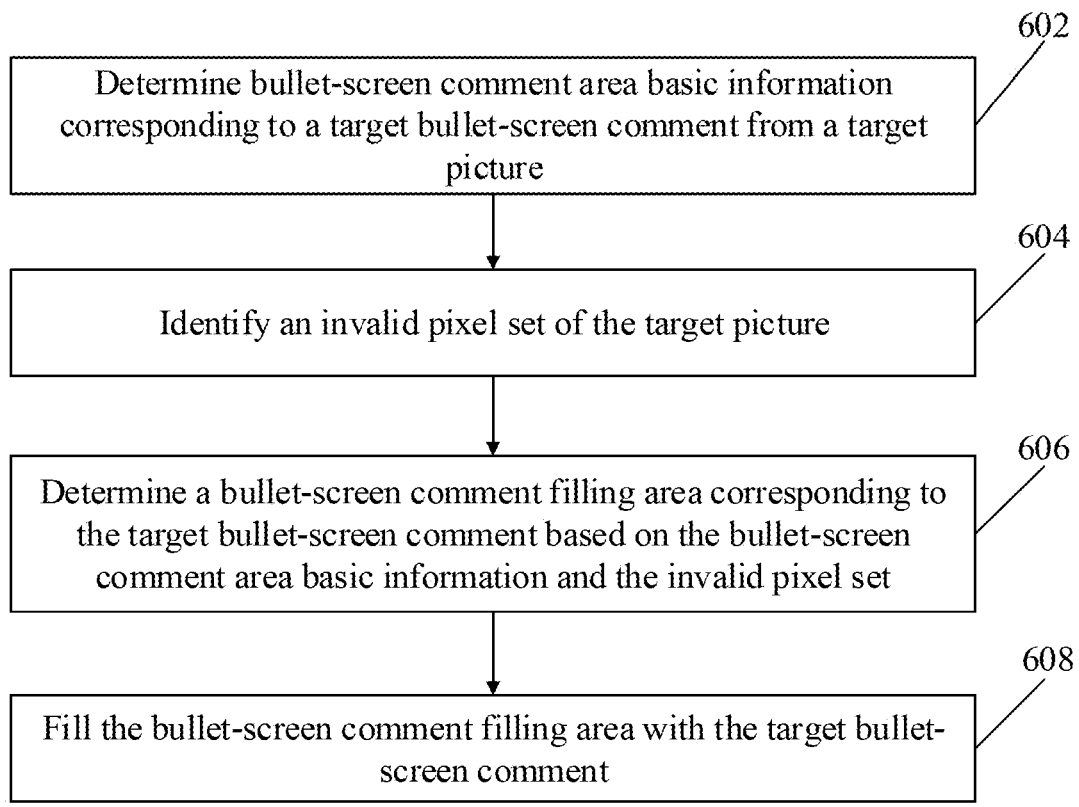
FIG. 6 is a flowchart of a second bullet-screen comment display method according to some embodiments of this application.

In actual application, filling a picture filling area with a bullet-screen comment in a bullet-screen comment stream needs to meet a preset filling rule. The following further explains and describes filling the picture filling area with the bullet-screen comment. FIG. 6 is a flowchart of a second bullet-screen comment display method according to some embodiments of this application. In this embodiment, a bullet-screen comment in a bullet-screen comment stream is referred to as a target bullet-screen comment, and a picture filling area is referred to as a target picture. The method specifically includes the following steps:

Step 602: Determine bullet-screen comment area basic information corresponding to a target bullet-screen comment from a target picture.

Specifically, the target picture specifically means the picture silhouette (the picture filling area) of the target picture in the foregoing embodiment. The target bullet-screen comment specifically means the target bullet-screen comment in the foregoing embodiment. In this embodiment, receiving a bullet-screen comment display instruction for the target picture may be understood as receiving a bullet-screen comment display instruction for the picture filling area. The bullet-screen comment display instruction is used to fill the picture filling area with the target bullet-screen comment.

The bullet-screen comment area basic information specifically means a rectangular area occupied by the target bullet-screen comment. For example, the bullet-screen comment area basic information of the target bullet-screen comment is 15*60, that is, an area occupied by a size of 15*60 pixels.

Specifically, the determining the bullet-screen comment area basic information corresponding to the target bullet-screen comment includes:
 obtaining word quantity information and preset font information of the target bullet-screen comment; and
 determining the bullet-screen comment area basic information corresponding to the target bullet-screen comment based on the word quantity information and the preset font information.

In actual application, the bullet-screen comment area basic information corresponding to the target bullet-screen comment needs to be further determined based on the word quantity information and the preset font information of the target bullet-screen comment. Further, the quantity of words of the target bullet-screen comment can affect length information in the bullet-screen comment area basic information, and the preset font information of the target bullet-screen comment can affect width information in the bullet-screen comment area basic information. For example, the preset font information of the target bullet-screen comment falls within a range of font 5-50. A minimum font size of the target bullet-screen comment is font 5, and a maximum font size is font 50. If a font is smaller than font 5, the target bullet-screen comment will not be displayed clearly. If a font is larger than font 50, the target bullet-screen comment will exceed the display area of the target picture. In some embodiments, a preset font of the target bullet-screen comment is set to a proper default font, for example, font 25.

After the word quantity information and the preset font information of the target bullet-screen comment are obtained, the bullet-screen comment area basic information corresponding to the target bullet-screen comment may be generated based on the word quantity information and the preset font information. It should be noted that, in actual application, the preset font information may be adjusted based on a subsequent step, the font information may be adjusted based on an actual situation, and the bullet-screen comment area basic information corresponding to the target bullet-screen comment is increased or decreased.

Step 604: Identify an invalid pixel set of the target picture.

In actual application, each picture includes individual pixels. The target picture also includes one n*m pixel. For example, a 600*800 picture indicates that each picture actually includes 600*800=480,000 pixels. The target picture includes a transparent part and a non-transparent part. The transparent part overlaps the target video, and does not hinder playback of the target video. The non-transparent part may fill the target bullet-screen comment.

Based on this, by analyzing attribute information of each pixel in the target picture, a data structure that stores information of each pixel may be obtained. Attribute information of each pixel, such as coordinate information and RGB information, is recorded in the data structure. The invalid pixel set in the target picture can be identified by analyzing the attribute information of each pixel. The invalid pixel is specifically a pixel that cannot be filled with a bullet-screen comment.

Specifically, identifying the invalid pixel set of the target picture includes:
 obtaining fillable attribute information corresponding to each pixel in the target picture; and
 determining the invalid pixel set based on the fillable attribute information corresponding to each pixel.

The fillable attribute information includes fillable or unfillable.

The determining the invalid pixel set based on the fillable attribute information corresponding to each pixel includes:
 adding a pixel whose fillable attribute information is unfillable to the invalid pixel set.

In actual application, the fillable attribute information may be determined based on the foregoing data structure, that is, the fillable attribute information is determined based on attribute information of each pixel. The attribute information may directly include fillable attribute information. The fillable attribute information may also be determined based on the RGB information of the pixel. For example, if the RGB information of the pixel is (0, 0, 0), it indicates that the pixel is transparent, and the pixel is an invalid pixel.

The fillable attribute information corresponding to each pixel may be obtained based on attribute information of each pixel in the data structure. Specifically, the fillable attribute information is fillable or unfillable, where a fillable pixel is a valid pixel, and an unfillable pixel is an invalid pixel, and further, it may be determined that a pixel whose fillable attribute information is unfillable is an invalid pixel.

Step 606: Determine a bullet-screen comment filling area corresponding to the target bullet-screen comment based on the bullet-screen comment area basic information and the invalid pixel set.

After the bullet-screen comment area basic information corresponding to the target bullet-screen comment and the invalid pixel set are determined, the bullet-screen comment filling area corresponding to the target bullet-screen comment may be determined based on the bullet-screen comment area basic information and the invalid pixel set, where the bullet-screen comment filling area specifically means an area that is in the target picture and that is used to fill the target bullet-screen comment. For example, if bullet-screen comment area basic information is 15*60, an area of a size of 15*60 needs to be determined in the target picture as the bullet-screen comment filling area corresponding to the target bullet-screen comment. The user subsequently fills the bullet-screen comment filling area with the target bullet-screen comment.

In actual application, the target bullet-screen comment may be pre-placed at a current location in the target picture, and a coverage pixel in the target picture corresponding to the target bullet-screen comment is determined based on the bullet-screen comment area basic information of the target bullet-screen comment. Then, whether an invalid pixel exists in the coverage pixel determines whether the target bullet-screen comment can be placed at the current location.

If no invalid pixel exists in the coverage pixel, the target bullet-screen comment may be placed. If an invalid pixel exists in the covered pixels, a new current location needs to be selected for the target bullet-screen comment, and the foregoing determining is performed again.

Specifically, determining the bullet-screen comment filling area corresponding to the target bullet-screen comment based on the bullet-screen comment area basic information and the invalid pixel set includes:

determining a target pixel in the target picture;

determining a to-be-filled area of the target bullet-screen comment based on the bullet-screen comment area basic information and the target pixel;

determining whether the to-be-filled area overlaps the invalid pixel set; and if the to-be-filled area overlaps the invalid pixel set, determining a next pixel in the target picture as the target pixel, and performing the operation of determining the to-be-filled area of the target bullet-screen comment based on the bullet-screen comment area basic information and the target pixel; or if the to-be-filled area does not overlap the invalid pixel set, determining that the to-be-filled area is the bullet-screen comment filling area corresponding to the target bullet-screen comment.

The target pixel specifically means a corresponding placement pixel when the target bullet-screen comment is placed in the target picture. For example, bullet-screen comment area basic information of the target bullet-screen comment is (a, b), where a is a length of bullet-screen comment area basic information, and b is a width of bullet-screen comment area basic information. If a pixel coordinate of the target pixel is $(x_1, y_1)$, it indicates that the bullet-screen comment area basic information may be placed in the target pixel. Specifically, the upper left corner of the bullet-screen comment area basic information may be placed in the target pixel.

When the bullet-screen comment area basic information is placed in the target pixel, a to-be-filled area of the bullet-screen comment in the target picture may be determined. For example, the bullet-screen comment area basic information as (a, b) is placed at the pixel coordinate $(x_1, y_1)$, the to-be-filled area is an area, in the target picture, in which $(x_1, y_1)$ is a coordinate of the upper left corner of the target bullet-screen comment, a is a length of the bullet-screen comment, and b is a width of the bullet-screen comment.

After the to-be-filled area is determined, it may be determined whether the to-be-filled area overlaps the invalid pixel set, that is, it is determined whether an invalid pixel exists in the to-be-filled area. Specifically, pixels in the to-be-filled area are traversed to determine fillable attribute information corresponding to each pixel.

If a fillable attribute of each pixel is fillable, it indicates that the to-be-filled area may be used as the bullet-screen comment filling area corresponding to the target bullet-screen comment.

If an invalid pixel exists in the to-be-filled area, that is, a pixel whose fillable attribute is unfillable exists in the to-be-filled area, it indicates that the to-be-filled area may not be used as the bullet-screen comment filling area corresponding to the target bullet-screen comment. A next pixel needs to be determined in the target picture as a new target pixel, a new to-be-filled area is determined based on the new target pixel and the bullet-screen comment area basic information again, whether the to-be-filled area overlaps the invalid pixel set is determined until the bullet-screen comment filling area corresponding to the target bullet-screen comment is determined.

In actual application, a quantity of pixels in the target picture is very large. For example, for a 600*800 picture, a quantity of pixels in the target picture reaches 480,000. If each pixel is sequentially selected as a target pixel, 480,000 pixels need to be traversed. Resource consumption of the client is huge. To further improve calculation efficiency, a process of determining a target pixel may be optimized. Specifically, the determining the target pixel in the target picture includes: determining an initial pixel in the target picture;

determining a pixel stride based on bullet-screen comment information of the target bullet-screen comment; and determining the target pixel in the target picture based on the initial pixel, the pixel stride, and a preset sampling track.

The initial pixel is a pixel selected for the first time, that is, the target pixel is determined starting from the initial pixel. In some embodiments, the initial pixel is a central pixel of the target picture.

The pixel stride specifically means several pixels that can be crossed at a time without traversing each pixel. For example, when the pixel stride is 10, and the initial pixel is set to 1, the second target pixel may be determined as the eleventh pixel, the third target pixel may be determined as the twenty-first pixel, and so on. In actual application, the pixel stride may be determined based on the bullet-screen comment information of the target bullet-screen comment, where the bullet-screen comment information includes a quantity of words of the target bullet-screen comment, a bullet-screen comment font information, and the like. This is not limited in this application, and is subject to actual application.

Figure 7:
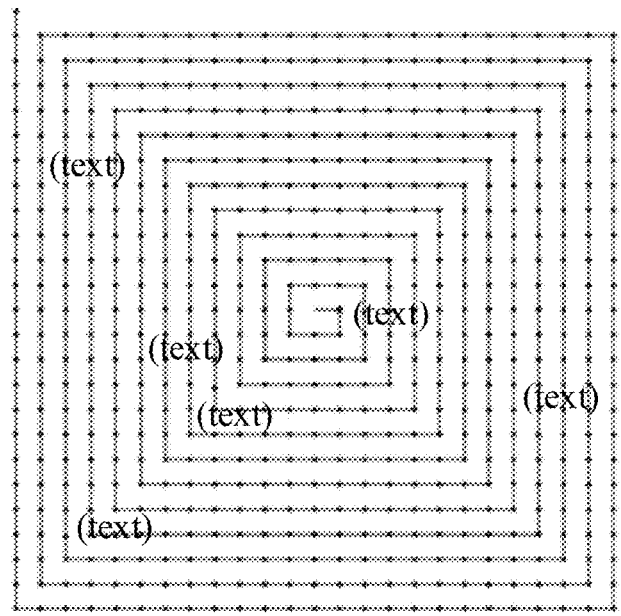
FIG. 7 is a schematic diagram of a rectangular helix according to some embodiments of this application.

After the initial pixel and the pixel stride are determined, the initial pixel may be used as a start point, and the target pixel is determined in a preset sampling track based on the pixel stride. In some embodiments, the preset sampling track is a rectangular helix, and the rectangular helix may be understood as an Archimedes helix in a rectangular style, that is, a track generated when a point leaves a fixed point at a uniform speed. FIG. 7 is a schematic diagram of a rectangular helix according to some embodiments of this application. As shown in FIG. 7, a center point in a picture is a central pixel of a target picture, the central pixel is used as an initial pixel and moves at a fixed pixel stride, and the target pixel is sequentially determined in the rectangular helix.

In another specific implementation provided in this application, the determining whether the to-be-filled area overlaps the invalid pixel set includes:

obtaining a pixel integral image of the target picture;

determining a first reference area, a second reference area, a third reference area, and a fourth reference area in the pixel integral image based on the to-be-filled area;

separately obtaining a first pixel sub-integral image of the first reference area, a second pixel sub-integral image of the second reference area, a third pixel sub-integral image of the third reference area, and a fourth pixel sub-integral image of the fourth reference area; and determining, based on the first pixel sub-integral image, the second pixel sub-integral image, the third pixel sub-integral image, and the fourth pixel sub-integral image, whether the to-be-filled area overlaps the invalid pixel set.

In actual application, after the to-be-filled area is determined, each pixel in the to-be-filled area needs to be traversed, and a process of determining whether an invalid pixel exists consumes more resources. Because in the foregoing step, the bullet-screen comment area basic information corresponding to the target bullet-screen comment is determined, and the bullet-screen comment area basic information is a rectangular area, a form of an integral graph may be used to quickly determine whether the to-be-filled area overlaps the invalid pixel set.

Figure 8:
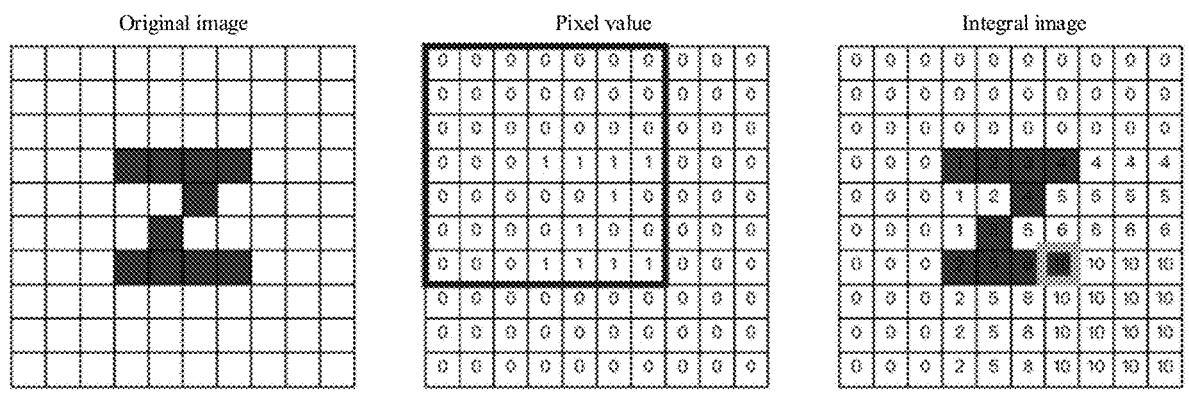
FIG. 8 is a schematic diagram of a pixel integral image according to some embodiments of this application.

A pixel integral image means that for a picture, after the picture is converted into a grayscale image, a value of any line in the integral image is a sum of gray values of all points in a rectangular area that is formed from the upper left corner of the image to this point. FIG. 8 is a schematic diagram of a pixel integral image according to some embodiments of this application. Referring to FIG. 8, an original image in FIG. 8 is a schematic diagram of a target picture. After the original image is converted into a grayscale image, a pixel with an image is marked as 1, and a pixel without an image is marked as 0, so that an image corresponding to a pixel value of the picture can be obtained, and then an integral image corresponding to the picture can be obtained by using description information of the integral image.

Figure 9:
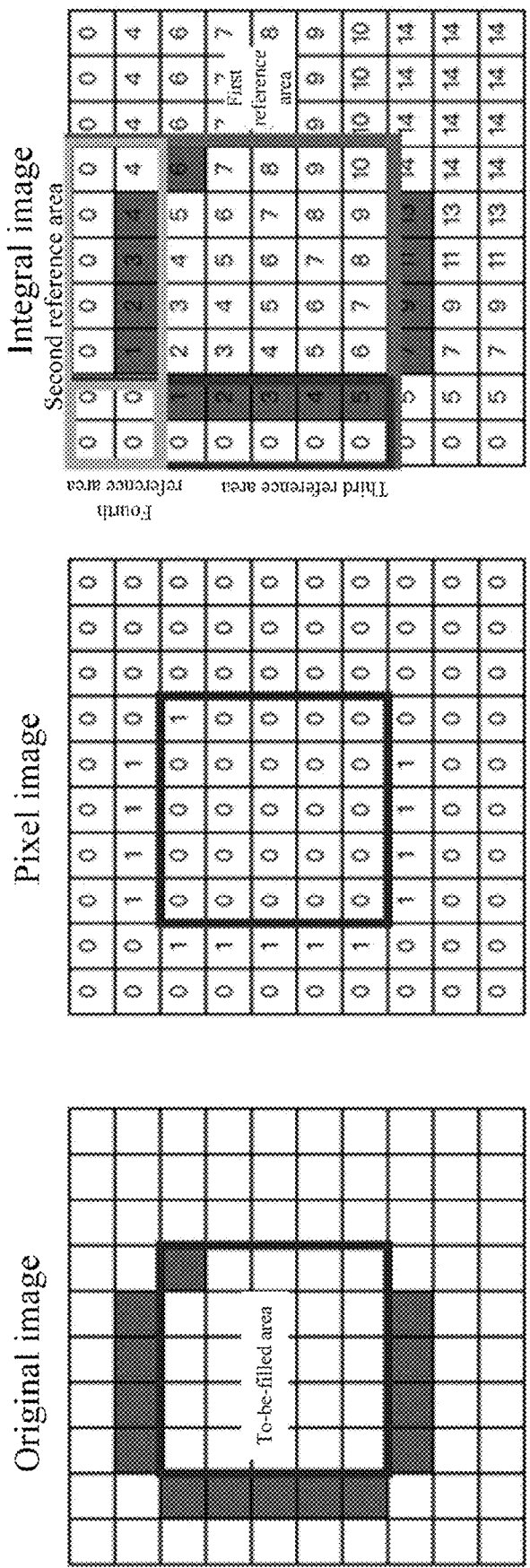
FIG. 9 is a schematic diagram of determining whether a to-be-filled area overlaps an invalid pixel set according to some embodiments of this application.

After the pixel integral image is obtained, a first reference area, a second reference area, a third reference area, and a fourth reference area are divided from the pixel integral image based on the to-be-filled area. FIG. 9 is a schematic diagram of determining whether a to-be-filled area overlaps an invalid pixel set according to some embodiments of this application. As shown in FIG. 9, an original image in FIG. 9 is a schematic diagram of mapping the to-be-filled area to a target picture. A block part in the original image is a to-be-filled area. In this case, a pixel image of the target picture and an integral image of the target picture are obtained. Four reference areas may be obtained in the integral image based on the to-be-filled area, which are separately a first reference area (an area from an upper left corner of the integral image to a lower right corner of the to-be-filled area), a second reference area (an area located above the to-be-filled area in the first reference area), a third reference area (an area located to the left of the to-be-filled area in the first reference area), and a fourth reference area (an area located above the left of the to-be-filled area in the first reference area).

After the four reference areas are obtained, an integral image corresponding to each reference area may be obtained. For the first reference area, it may be determined that a value of a first pixel sub-integral image is 10; for the second reference area, it may be determined that a value of a second pixel sub-integral image is 4; for the third reference area, it may be determined that a value of a third pixel sub-integral image is 5; and for the fourth reference area, it may be determined that a value of a fourth pixel sub-integral image is 0.

Then, whether the to-be-filled area overlaps the invalid pixel set is determined based on the first pixel sub-integral image, the second pixel sub-integral image, the third pixel sub-integral image, and the fourth pixel sub-integral image.

Specifically, the determining, based on the first pixel sub-integral image, the second pixel sub-integral image, the third pixel sub-integral image, and the fourth pixel sub-integral image, whether the to-be-filled area overlaps the invalid pixel set includes:

calculating a pixel value of the to-be-filled area based on the first pixel sub-integral image, the second pixel sub-integral image, the third pixel sub-integral image, and the fourth pixel sub-integral image; and when the pixel value is 0, determining that the to-be-filled area does not overlap the invalid pixel set; or when the pixel value is not 0, determining that the to-be-filled area overlaps the invalid pixel set.

After the first pixel sub-integral image, the second pixel sub-integral image, the third pixel sub-integral image, and the fourth pixel sub-integral image are obtained, a pixel value corresponding to each pixel sub-integral image may be separately obtained. For example, in FIG. 9, a value of the first pixel sub-integral image is 10, a value of the second pixel sub-integral image is 4, a value of the third pixel sub-integral image is 5, and a value of the fourth pixel sub-integral image is 0. The following formula 1 may be used to determine the pixel value of the to-be-filled area.

$$M=A-B-C+D \qquad \text{formula 1}$$

M represents a pixel value of the to-be-filled area, A represents a pixel value of the first reference area, B represents a pixel value of the second reference area, C represents a pixel value of the third reference area, and D represents a pixel value of the fourth reference area. In this way, only pixel values of the four reference areas are needed to calculate the pixel value of the to-be-filled area, to determine whether the to-be-filled area overlaps with the invalid pixel set.

If the pixel value of the to-be-filled area is calculated as 0, it indicates that the to-be-filled area does not overlap the invalid pixel set, and the to-be-filled area may be used as a bullet-screen comment filling area of the target bullet-screen comment.

If the pixel value of the to-be-filled area is not calculated as 0, it indicates that the to-be-filled area overlaps with the invalid pixel set, and a next pixel in the target picture as a new target pixel needs to be determined, and the operation of determining the to-be-filled area of the target bullet-screen comment based on the bullet-screen comment area basic information and the target pixel is performed.

Step 608: Fill the bullet-screen comment filling area with the target bullet-screen comment.

After the bullet-screen comment filling area is determined, the bullet-screen comment filling area may be filled with the target bullet-screen comment, which is further rendered to a screen and presented to the user.

In actual application, to optimize rendering efficiency and combine some animation effects, the foregoing layout results may be combined into a plurality of pictures in batches, and a final rendering effect is implemented by superimposing the pictures. In addition, in a combination process, different rendering effects may be displayed by setting a color mixing mode, to provide better watching experience for the user.

The second bullet-screen comment display method used in the embodiment of this application includes: determining bullet-screen comment area basic information corresponding to a target bullet-screen comment from a target picture; identifying an invalid pixel set of the target picture; determining a bullet-screen comment filling area corresponding to the target bullet-screen comment based on the bullet-screen comment area basic information and the invalid pixel set; and filling the bullet-screen comment filling area with the target bullet-screen comment. In this method, in a process of filling the target picture with the bullet-screen comment, the bullet-screen comment filling area corresponding to the target bullet-screen comment can be quickly identified in the target picture, thereby improving identification efficiency.

Figure 10:
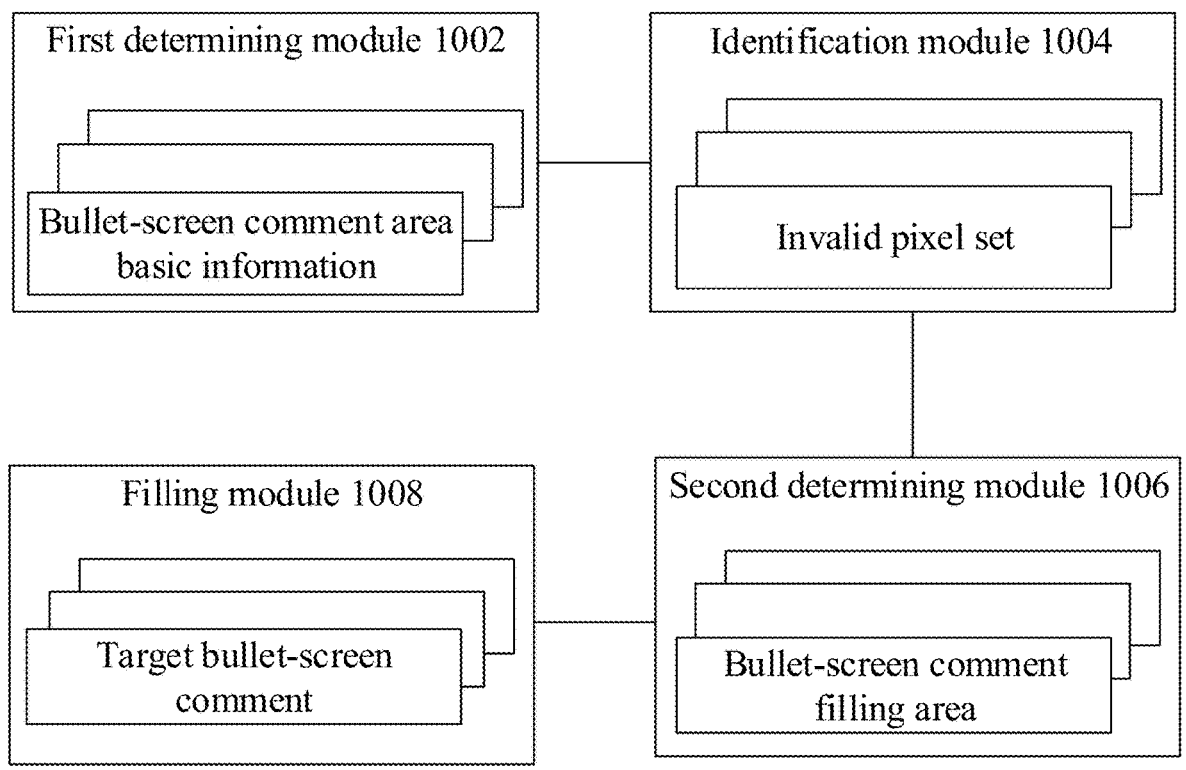
FIG. 10 is a schematic diagram of a structure of a second bullet-screen comment display apparatus according to some embodiments of this application.

Corresponding to the second bullet-screen comment display method embodiment, this application further provides a second bullet-screen comment display apparatus embodiment. FIG. 10 is a schematic diagram of a structure of a bullet-screen comment display apparatus according to some embodiments of this application. As shown in FIG. 10, the apparatus includes:

a first determining module 1002, configured to determine bullet-screen comment area basic information corresponding to a target bullet-screen comment from a target picture;

an identification module 1004, configured to identify an invalid pixel set of the target picture;

a second determining module 1006, configured to determine a bullet-screen comment filling area corresponding to the target bullet-screen comment based on the bullet-screen comment area basic information and the invalid pixel set; and a filling module 1008, configured to fill the bullet-screen comment filling area with the target bullet-screen comment.

In some embodiments, the identification module 1004 is further configured to:

obtain fillable attribute information corresponding to each pixel in the target picture; and determine the invalid pixel set based on the fillable attribute information corresponding to each pixel.

In some embodiments, the fillable attribute information includes fillable or unfillable.

The identification module 1004 is further configured to:
add a pixel whose fillable attribute information is unfillable to the invalid pixel set.

In some embodiments, the second determining module 1006 is further configured to:

determine a target pixel in the target picture;

determine a to-be-filled area of the target bullet-screen comment based on the bullet-screen comment area basic information and the target pixel;

determine whether the to-be-filled area overlaps the invalid pixel set; and if the to-be-filled area overlaps the invalid pixel set, determine a next pixel in the target picture as the target pixel, and perform the operation of determining the to-be-filled area of the target bullet-screen comment based on the bullet-screen comment area basic information and the target pixel; or if the to-be-filled area does not overlap the invalid pixel set, determine that the to-be-filled area is the bullet-screen comment filling area corresponding to the target bullet-screen comment.

In some embodiments, the second determining module 1006 is further configured to:

determine an initial pixel in the target picture;

determine a pixel stride based on bullet-screen comment information of the target bullet-screen comment; and determine the target pixel in the target picture based on the initial pixel, the pixel stride, and a preset sampling track.

In some embodiments, the initial pixel is a central pixel of the target picture, and the preset sampling track is a rectangular helix.

In some embodiments, the second determining module 1006 is further configured to:

obtain a pixel integral image of the target picture;

determine a first reference area, a second reference area, a third reference area, and a fourth reference area in the pixel integral image based on the to-be-filled area;

separately obtain a first pixel sub-integral image of the first reference area, a second pixel sub-integral image of the second reference area, a third pixel sub-integral image of the third reference area, and a fourth pixel sub-integral image of the fourth reference area; and determine, based on the first pixel sub-integral image, the second pixel sub-integral image, the third pixel sub-integral image, and the fourth pixel sub-integral image, whether the to-be-filled area overlaps the invalid pixel set.

In some embodiments, the second determining module 1006 is further configured to:

calculate a pixel value of the to-be-filled area based on the first pixel sub-integral image, the second pixel sub-integral image, the third pixel sub-integral image, and the fourth pixel sub-integral image; and when the pixel value is 0, determine that the to-be-filled area does not overlap the invalid pixel set; or when the pixel value is not 0, determine that the to-be-filled area overlaps the invalid pixel set.

In some embodiments, the first determining module 1002 is further configured to:

obtain word quantity information and preset font information of the target bullet-screen comment; and determine the bullet-screen comment area basic information corresponding to the target bullet-screen comment based on the word quantity information and the preset font information.

The second bullet-screen comment display apparatus used in some embodiments of this application determines bullet-screen comment area basic information corresponding to a target bullet-screen comment from a target picture; identifies an invalid pixel set of the target picture; determines a bullet-screen comment filling area corresponding to the target bullet-screen comment based on the bullet-screen comment area basic information and the invalid pixel set; and fills the bullet-screen comment filling area with the target bullet-screen comment. By using the apparatus, in a process of filling the target picture with the bullet-screen comment, the bullet-screen comment filling area corresponding to the target bullet-screen comment can be quickly identified in the target picture, thereby improving identification efficiency.

The foregoing is a schematic solution of the second bullet-screen comment display apparatus in this embodiment. It should be noted that the technical solution of the bullet-screen comment display apparatus and the technical solution of the foregoing bullet-screen comment display method belong to the same concept. For details not described in the technical solution of the bullet-screen comment display apparatus, references can be made to the descriptions of the technical solution of the foregoing bullet-screen comment display method.

Figure 11:
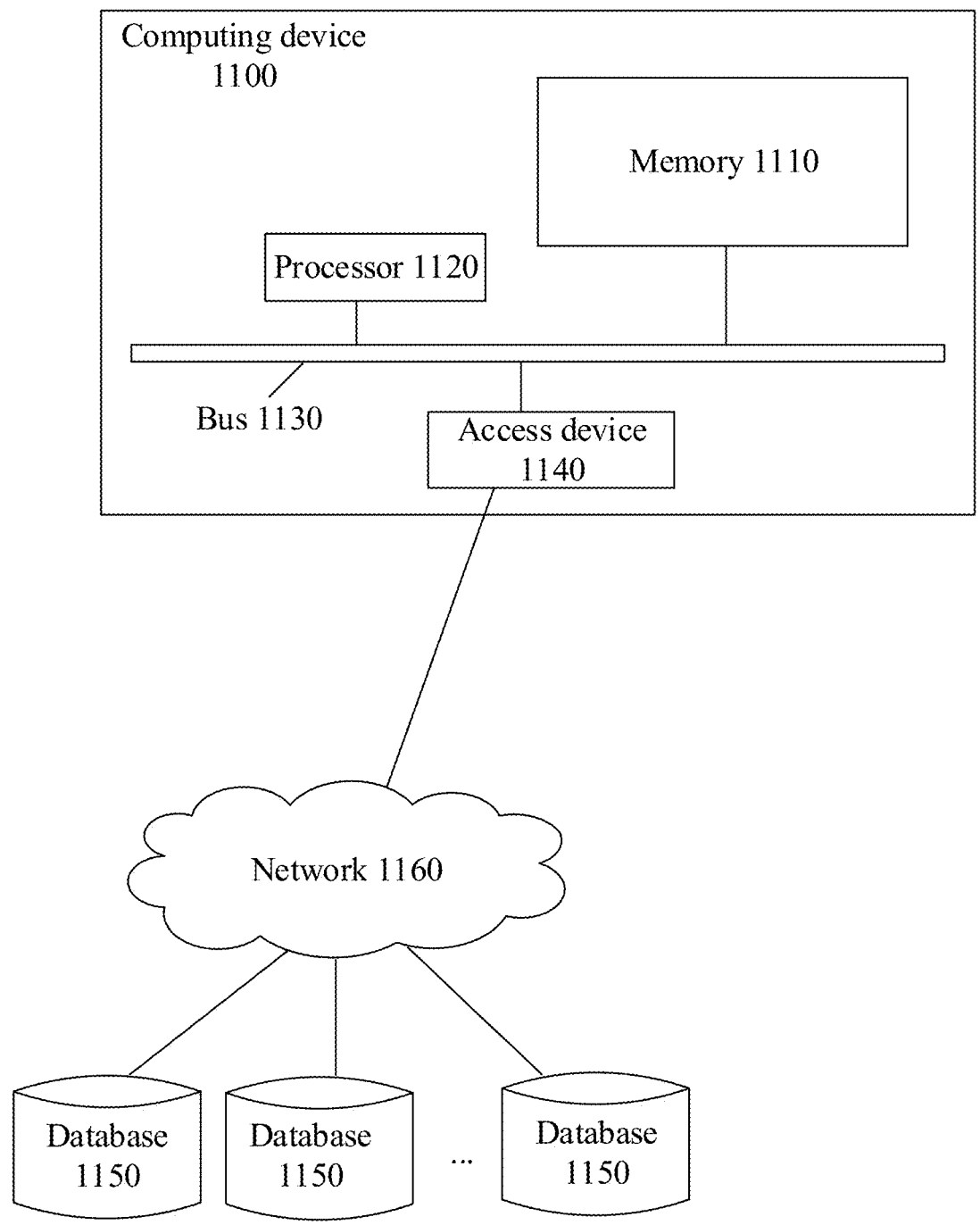
FIG. 11 is a block diagram of a structure of a computing device according to some embodiments of this application.

FIG. 11 is a block diagram of a structure of a computing device 1100 according to some embodiments of this application. Components of the computing device 1100 include, but are not limited to, a memory 1110 and a processor 1120. The processor 1120 and the memory 1110 are connected by using a bus 1130, and a database 1150 is configured to store data.

The computing device 1100 further includes an access device 1140, and the access device 1140 enables the computing device 1100 to communicate by using one or more networks 1160. Examples of these networks include a public switched telephone network (PSTN), a local area network (LAN), a wide area network (WAN), a private area network (PAN), or a combination of communication networks such as the Internet. The access device 1140 may include one or more of any type of wired or wireless network interface (for example, a network interface card (NIC)), for example, an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, or a near field communication (NFC) interface.

In some embodiments of this application, the foregoing components of the computing device 1100 and other components not shown in FIG. 11 may be alternatively connected to each other, for example, by using the bus. It should be understood that the block diagram illustrating the structure of the computing device shown in FIG. 11 is merely used as an example instead of a limitation on the scope of this application. A person skilled in the art may add or substitute other components as required.

The computing device 1100 may be any type of still or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), another type of mobile device, or a still computing device such as a desktop computer or a PC. The computing device 1100 may be alternatively a mobile or still server.

When the processor 1120 executes the computer instructions, the steps of the bullet-screen comment display method are implemented.

The foregoing describes a schematic solution of the computing device in this embodiment. It should be noted that the technical solution of the computing device and the technical solution of the bullet-screen comment display method belong to a same concept. For details not described in detail in the technical solution of the computing device, refer to the descriptions of the technical solution of the bullet-screen comment display method.

Some embodiments of this application further provides a computer-readable storage medium, where the computer-readable storage medium stores computer instructions, and when the computer instructions are executed by a processor, the steps of the bullet-screen comment display method are implemented.

The foregoing describes a schematic solution of the computer-readable storage medium according to this embodiment. It should be noted that the technical solution of the storage medium and the technical solution of the bullet-screen comment display method belong to a same concept. For details not described in detail in the technical solution of the storage medium, refer to the descriptions of the technical solution of the bullet-screen comment display method.

Specific embodiments of this application are described above. Other embodiments fall within the scope of the appended claims. In some cases, the actions or steps recorded in the claims can be performed in an order different from the order in the embodiments and the desired results can still be achieved. In addition, the process depicted in the accompanying drawings does not necessarily require the shown particular order or consecutive order to achieve the desired results. In some implementations, multi-task processing and parallel processing can or may be advantageous.

The computer instructions include computer program code. The computer program code may be in a source code form, an object code form, an executable file form, an intermediate form, or the like. The computer-readable medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program code. It should be noted that content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the embodiments described in this specification are all embodiments, and involved actions and modules are not necessarily mandatory to this application.

In the foregoing embodiments, descriptions of the embodiments have respective focuses. For a part that is not described in detail in an embodiment, refer to related descriptions in another embodiment.

Some embodiments of this application disclosed above are merely intended to help describe this application. In the optional embodiments, all details are not described in detail, and the present disclosure is not limited to the specific implementations. Clearly, many modifications and changes may be made based on the content of this application. These embodiments are selected and specifically described in this application to better explain the principle and the actual application of this application, so that a person skilled in the art can better understand and use this application. This application is only subjected to the claims and the scope and equivalents thereof.

What is claimed is:

1. A method, comprising:
   determining bullet-screen comment area basic information corresponding to a target bullet-screen comment from a target picture;
   identifying an invalid pixel set of the target picture;
   determining a bullet-screen comment filling area corresponding to the target bullet-screen comment based on the bullet-screen comment area basic information and the invalid pixel set, comprising:
   determining a target pixel in the target picture;
   determining a to-be-filled area of the target bullet-screen comment based on the bullet-screen comment area basic information and the target pixel;
   determining whether the to-be-filled area overlaps the invalid pixel set; and
   in response to determining that the to-be-filled area overlaps the invalid pixel set, determining a next pixel in the target picture as the target pixel, and performing the operation of determining the to-be-filled area of the target bullet-screen comment based on the bullet-screen comment area basic information and the target pixel; or in response to determining that the to-be-filled area does not overlap the invalid pixel set, determining that the to-be-filled area is the bullet-screen comment filling area corresponding to the target bullet-screen comment; and filling the bullet-screen comment filling area with the target bullet-screen comment.

2. The method according to claim 1, wherein the identifying the invalid pixel set of the target picture comprises:
obtaining fillable attribute information corresponding to each pixel in the target picture; and
determining the invalid pixel set based on the fillable attribute information corresponding to each pixel.

3. The method according to claim 2, wherein the fillable attribute information comprises fillable or unfillable; and
the determining the invalid pixel set based on the fillable attribute information corresponding to each pixel comprises:
adding a pixel whose fillable attribute information is unfillable to the invalid pixel set.

4. The method according to claim 1, wherein the determining the target pixel in the target picture comprises:
determining an initial pixel in the target picture;
determining a pixel stride based on bullet-screen comment information of the target bullet-screen comment; and
determining the target pixel in the target picture based on the initial pixel, the pixel stride, and a preset sampling track.

5. The method according to claim 4, wherein the initial pixel is a central pixel of the target picture, and the preset sampling track is a rectangular helix.

6. The method according to claim 1, wherein the determining whether the to-be-filled area overlaps the invalid pixel set comprises:
obtaining a pixel integral image of the target picture;
determining a first reference area, a second reference area, a third reference area, and a fourth reference area in the pixel integral image based on the to-be-filled area;
separately obtaining a first pixel sub-integral image of the first reference area, a second pixel sub-integral image of the second reference area, a third pixel sub-integral image of the third reference area, and a fourth pixel sub-integral image of the fourth reference area; and
determining, based on the first pixel sub-integral image, the second pixel sub-integral image, the third pixel sub-integral image, and the fourth pixel sub-integral image, whether the to-be-filled area overlaps the invalid pixel set.

7. The method according to claim 6, wherein the determining, based on the first pixel sub-integral image, the second pixel sub-integral image, the third pixel sub-integral image, and the fourth pixel sub-integral image, whether the to-be-filled area overlaps the invalid pixel set comprises:
calculating a pixel value of the to-be-filled area based on the first pixel sub-integral image, the second pixel sub-integral image, the third pixel sub-integral image, and the fourth pixel sub-integral image; and
in response to determining that the pixel value is 0, determining that the to-be-filled area does not overlap the invalid pixel set; or
in response to determining that the pixel value is not 0, determining that the to-be-filled area overlaps the invalid pixel set.

8. The method according to claim 1, wherein the determining bullet-screen comment area basic information corresponding to the target bullet-screen comment comprises:

obtaining word quantity information and preset font information of the target bullet-screen comment; and
determining the bullet-screen comment area basic information corresponding to the target bullet-screen comment based on the word quantity information and the preset font information.

9. A computing device, comprising:
one or more processors; and
a memory, storing one or more programs configured to be executed by the one or more processors, the one or more programs comprising instructions for:
determining bullet-screen comment area basic information corresponding to a target bullet-screen comment from a target picture;
identifying an invalid pixel set of the target picture;
determining a bullet-screen comment filling area corresponding to the target bullet-screen comment based on the bullet-screen comment area basic information and the invalid pixel set, comprising:
determining a target pixel in the target picture;
determining a to-be-filled area of the target bullet-screen comment based on the bullet-screen comment area basic information and the target pixel;
determining whether the to-be-filled area overlaps the invalid pixel set; and
in response to determining that the to-be-filled area overlaps the invalid pixel set, determining a next pixel in the target picture as the target pixel, and performing the operation of determining the to-be-filled area of the target bullet-screen comment based on the bullet-screen comment area basic information and the target pixel; or
in response to determining that the to-be-filled area does not overlap the invalid pixel set, determining that the to-be-filled area is the bullet-screen comment filling area corresponding to the target bullet-screen comment; and
filling the bullet-screen comment filling area with the target bullet-screen comment.

10. The computing device according to claim 9, wherein the identifying the invalid pixel set of the target picture comprises:
obtaining fillable attribute information corresponding to each pixel in the target picture; and
determining the invalid pixel set based on the fillable attribute information corresponding to each pixel.

11. The computing device according to claim 10, wherein the fillable attribute information comprises fillable or unfillable; and
the determining the invalid pixel set based on the fillable attribute information corresponding to each pixel comprises:
adding a pixel whose fillable attribute information is unfillable to the invalid pixel set.

12. The computing device according to claim 10, wherein the determining the target pixel in the target picture comprises:
determining an initial pixel in the target picture;
determining a pixel stride based on bullet-screen comment information of the target bullet-screen comment; and
determining the target pixel in the target picture based on the initial pixel, the pixel stride, and a preset sampling track.

13. The computing device according to claim 12, wherein the initial pixel is a central pixel of the target picture, and the preset sampling track is a rectangular helix.

14. The computing device according to claim 9, wherein the determining whether the to-be-filled area overlaps the invalid pixel set comprises:

obtaining a pixel integral image of the target picture;

determining a first reference area, a second reference area, a third reference area, and a fourth reference area in the pixel integral image based on the to-be-filled area;

separately obtaining a first pixel sub-integral image of the first reference area, a second pixel sub-integral image of the second reference area, a third pixel sub-integral image of the third reference area, and a fourth pixel sub-integral image of the fourth reference area; and determining, based on the first pixel sub-integral image, the second pixel sub-integral image, the third pixel sub-integral image, and the fourth pixel sub-integral image, whether the to-be-filled area overlaps the invalid pixel set.

15. The computing device according to claim 14, wherein the determining, based on the first pixel sub-integral image, the second pixel sub-integral image, the third pixel sub-integral image, and the fourth pixel sub-integral image, whether the to-be-filled area overlaps the invalid pixel set comprises:

calculating a pixel value of the to-be-filled area based on the first pixel sub-integral image, the second pixel sub-integral image, the third pixel sub-integral image, and the fourth pixel sub-integral image; and in response to determining that the pixel value is 0, determining that the to-be-filled area does not overlap the invalid pixel set; or in response to determining that the pixel value is not 0, determining that the to-be-filled area overlaps the invalid pixel set.

16. The computing device according to claim 9, wherein the determining bullet-screen comment area basic information corresponding to the target bullet-screen comment comprises:

obtaining word quantity information and preset font information of the target bullet-screen comment; and determining the bullet-screen comment area basic information corresponding to the target bullet-screen comment based on the word quantity information and the preset font information.

17. A non-transitory computer-readable storage medium, storing one or more programs comprising instructions that, when executed by one or more processors of a computing device, cause the computing device to perform operations comprising:

determining bullet-screen comment area basic information corresponding to a target bullet-screen comment from a target picture;

identifying an invalid pixel set of the target picture;

determining a bullet-screen comment filling area corresponding to the target bullet-screen comment based on the bullet-screen comment area basic information and the invalid pixel set, comprising:

determining a target pixel in the target picture;

determining a to-be-filled area of the target bullet-screen comment based on the bullet-screen comment area basic information and the target pixel;

determining whether the to-be-filled area overlaps the invalid pixel set; and in response to determining that the to-be-filled area overlaps the invalid pixel set, determining a next pixel in the target picture as the target pixel, and performing the operation of determining the to-be-filled area of the target bullet-screen comment based on the bullet-screen comment area basic information and the target pixel; or in response to determining that the to-be-filled area does not overlap the invalid pixel set, determining that the to-be-filled area is the bullet-screen comment filling area corresponding to the target bullet-screen comment; and filling the bullet-screen comment filling area with the target bullet-screen comment.

18. The non-transitory computer-readable storage medium according to claim 17, wherein the identifying the invalid pixel set of the target picture comprises:

obtaining fillable attribute information corresponding to each pixel in the target picture; and determining the invalid pixel set based on the fillable attribute information corresponding to each pixel.

* * * * *